(12) United States Patent
Rahman et al.

(10) Patent No.: US 11,056,943 B2
(45) Date of Patent: Jul. 6, 2021

(54) STATOR ASSEMBLY WITH ELECTRICALLY BALANCED CONDUCTOR LAYERS

(71) Applicant: GM Global Technology Operations LLC, Detroit, MI (US)

(72) Inventors: Khwaja M. Rahman, Troy, MI (US); Xiaohui Du, West Bloomfield, MI (US); Edward L. Kaiser, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 16/026,430

(22) Filed: Jul. 3, 2018

(65) Prior Publication Data

US 2020/0014267 A1 Jan. 9, 2020

(51) Int. Cl.
*H02K 3/28* (2006.01)
*H02K 1/16* (2006.01)
*H02K 7/04* (2006.01)
*H02K 3/14* (2006.01)
*H02K 3/34* (2006.01)
*H02K 1/27* (2006.01)

(52) U.S. Cl.
CPC .............. *H02K 3/28* (2013.01); *H02K 1/16* (2013.01); *H02K 1/276* (2013.01); *H02K 3/14* (2013.01); *H02K 3/34* (2013.01); *H02K 7/04* (2013.01)

(58) Field of Classification Search
CPC ........... H02K 3/28; H02K 1/16; H02K 1/276; H02K 3/14; H02K 3/34; H02K 7/04
See application file for complete search history.

(56) References Cited

U.S. PATENT DOCUMENTS

| 9,379,586 | B2 | 6/2016 | Rahman et al. | |
|---|---|---|---|---|
| 9,520,753 | B2 | 12/2016 | Rahman et al. | |
| 2004/0061400 | A1* | 4/2004 | Fukushima | H02K 3/28 310/184 |
| 2005/0206263 | A1* | 9/2005 | Cai | H02K 3/12 310/198 |
| 2009/0140596 | A1 | 6/2009 | Kaiser et al. | |
| 2014/0285054 | A1* | 9/2014 | Han | H02K 3/12 310/201 |
| 2016/0285334 | A1 | 9/2016 | Turnbull et al. | |
| 2017/0353071 | A1* | 12/2017 | Saito | H02K 3/28 |

* cited by examiner

*Primary Examiner* — Thienvu V Tran
*Assistant Examiner* — Bart Iliya
(74) *Attorney, Agent, or Firm* — Quinn IP Law (57) ABSTRACT

A stator assembly includes a plurality of stator slots having multiple respective slot layers and a plurality of hairpins. The plurality of hairpins have a respective first leg positioned in one of the multiple respective slot layers and a respective second leg positioned in another of the multiple respective slot layers. A first set of n adjacent slots of the plurality of stator slots is configured to accommodate the plurality of hairpins carrying a current in a first phase, n being an integer. The plurality of hairpins is configured in respective conductor layers ($L_1, L_2 \ldots$) having a plurality of respective turn locations defining n respective turn positions. The plurality of hairpins is configured to occupy the n respective turn positions an equal number of times such that the respective conductor layers ($L_1, L_2 \ldots$) are electrically balanced.

15 Claims, 4 Drawing Sheets

STATOR ASSEMBLY WITH ELECTRICALLY BALANCED CONDUCTOR LAYERS

INTRODUCTION

The disclosure relates generally to a stator assembly in an electric machine, and more particularly, to a stator assembly with electrically balanced conductor layers. An electric machine typically includes a stator having a plurality of stator windings and a rotor rotatable within the stator. In a generator mode, the rotation of the rotor induces voltage in the stator winding, which powers an external load such as charging a battery pack. Alternately, if an electric current is passed through the stator windings, the energized coils may cause the rotor to rotate and the machine will perform as a motor. The stator assembly generally includes a plurality of stator windings inserted into slots in the stator assembly. A bar wound stator assembly may be employed in electric machines to improve machine thermal and overall performance.

SUMMARY

A stator assembly includes a plurality of stator slots having multiple respective slot layers and a plurality of hairpins. The plurality of hairpins have a respective first leg positioned in one of the multiple respective slot layers and a respective second leg positioned in another of the multiple respective slot layers, the plurality of hairpins being configured to allow a current to flow from the respective first leg to the respective second leg. A first set of n adjacent slots of the plurality of stator slots is configured to accommodate the plurality of hairpins carrying the current in a first phase, n being an integer. The plurality of hairpins is configured in respective conductor layers ($L_1, L_2 \ldots$) having a plurality of respective turn locations defining n respective turn positions (same integer n as the number of adjacent slots carrying the same phase current). The plurality of hairpins is configured to occupy the n respective turn positions an equal number of times such that the respective conductor layers ($L_1, L_2 \ldots$) are electrically balanced.

The n respective turn positions are characterized by a respective phase shifted voltage ($v_n$), with the plurality of hairpins in the respective conductor layers ($L_1, L_2 \ldots$) having an equal total voltage $V=(\Sigma v_{i,\ i=1\ to\ n})$. A second set of n adjacent slots of the plurality of stator slots is configured to accommodate the plurality of hairpins carrying the current in a second phase. A third set of n adjacent slots of the plurality of stator slots is configured to accommodate the plurality of hairpins carrying the current in a third phase.

The plurality of hairpins extends through the plurality of stator slots between a crown end and a weld end. At least one of the plurality of hairpins in the respective conductor layers ($L_1, L_2 \ldots$) is a nested conductor encapsulated by remaining ones of the plurality of hairpins at the crown end. The nested conductor may be at least partially covered with an epoxy coating configured to minimize direct contact between the nested conductor and the remaining ones of the plurality of hairpins.

In one example, the plurality of hairpins in the respective conductor layers ($L_1, L_2, \ldots$) include a first hairpin ($A_1$), a second hairpin ($A_2$), a third hairpin ($A_3$) and a fourth hairpin ($A_4$), and the integer n has a value of four. Here, the plurality of respective turn locations may include four respective turn locations configured as ($A_1, A_2, A_3, A_4$), ($A_4, A_1, A_2, A_3$), ($A_3, A_4, A_1, A_2$) and ($A_2, A_3, A_4, A_1$), respectively. The order shown in the brackets reflects the n respective turn positions. A first junction between a first adjacent pair of the four respective turn locations may include four series connections. A second junction between a second adjacent pair of the four respective turn locations may include at least one parallel connection and at least one series connection. Alternatively, the second junction may include four parallel connections.

In another example, the plurality of hairpins in the respective conductor layers ($L_1, L_2, \ldots$) include a first hairpin ($C_1$), a second hairpin ($C_2$), a third hairpin ($C_3$) and a fourth hairpin ($C_4$), and the integer n has a value of three. Here, the plurality of respective turn locations may include four respective turn locations configured as ($C_1, C_2, C_3$), ($C_4, C_1, C_2$), ($C_3, C_4, C_1$) and ($C_2, C_3, C_4$), respectively. In yet another example, the plurality of hairpins in the respective conductor layers ($L_1, L_2, \ldots$) include a first hairpin ($B_1$) and a second hairpin ($B_2$), and the integer n has a value of two. Here, the plurality of respective turn locations may include four respective turn locations configured as ($B_1, B_2$), ($B_2, B_1$), ($B_2, B_1$) and ($B_1, B_2$), respectively. As noted above, the order shown in the brackets reflects the n respective turn positions.

The respective conductor layers may include first, second, third, fourth, fifth and sixth conductor layers and the plurality of slot layers may include first, second, third, fourth, fifth and sixth slot layers. The first conductor layer may be defined by the plurality of hairpins with the respective first leg in the first slot layer and the respective second leg in the second slot layer. The second conductor layer may be defined by the plurality of hairpins with the respective first leg in the second slot layer and the respective second leg in the first slot layer. The third conductor layer may be defined by the plurality of hairpins with the respective first leg in the third slot layer and the respective second leg in the fourth slot layer. The fourth conductor layer may be defined by the plurality of hairpins with the respective first leg in the fourth slot layer and the respective second leg in the third slot layer. The fifth conductor layer may be defined by the plurality of hairpins with the respective first leg in the fifth slot layer and the respective second leg in the sixth slot layer. The sixth conductor layer may be defined by the plurality of hairpins with the respective first leg in the sixth slot layer and the respective second leg in the fifth slot layer.

In one example, the plurality of hairpins is configured as a first winding set, a second winding set, a third winding set and a fourth winding set connected in parallel to one another. The first winding set may include four of the plurality of hairpins from the first conductor layer connected in series via a first jumper with four of the plurality of hairpins from the third conductor layer and connected in series via a second jumper with four of the plurality of hairpins from the fifth conductor layer. The second winding set may include four of the plurality of hairpins from the first conductor layer connected in series via a third jumper with four of the plurality of hairpins from the third conductor layer and connected in series via a fourth jumper with four of the plurality of hairpins from the fifth conductor layer.

The third winding set may include four of the plurality of hairpins from the second conductor layer connected in series via a fifth jumper with four of the plurality of hairpins from the fourth conductor layer and connected in series via a sixth jumper with four of the plurality of hairpins from the sixth conductor layer. The fourth winding set may include four of the plurality of hairpins from the second conductor layer connected in series via a seventh jumper with four of the plurality of hairpins from the fourth conductor layer and connected in series via an eighth jumper with four of the plurality of hairpins from the sixth conductor layer.

The above features and advantages and other features and advantages of the present disclosure are readily apparent from the following detailed description of the best modes for carrying out the disclosure when taken in connection with the accompanying drawings.

DETAILED DESCRIPTION

Figure 1:
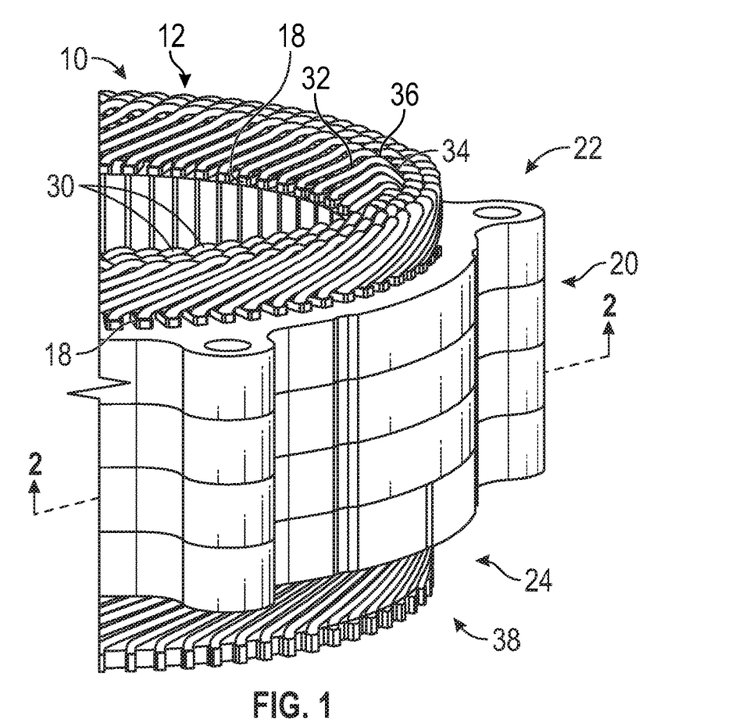
FIG. 1 is a schematic fragmentary perspective view of an electric machine with a stator assembly having a plurality of hairpins.

Referring to the FIGS., wherein like reference numbers refer to the same or similar components throughout the several views, FIG. 1 is a schematic fragmentary perspective view of an electric motor/generator or electric traction machine, referred to herein as electric machine 10, having a stator assembly 12. The electric machine 10 is configured to generate an electric machine torque by, for example, converting electrical energy into rotational motion. For instance, the electric machine 10 may be configured to receive electrical energy from a power source, such as a battery array (not shown). The electric machine 10 may be configured to use AC voltage from an inverter (not shown) to generate rotational motion. The electric machine 10 may be further configured to generate electrical energy when provided with a torque.

Figure 2:
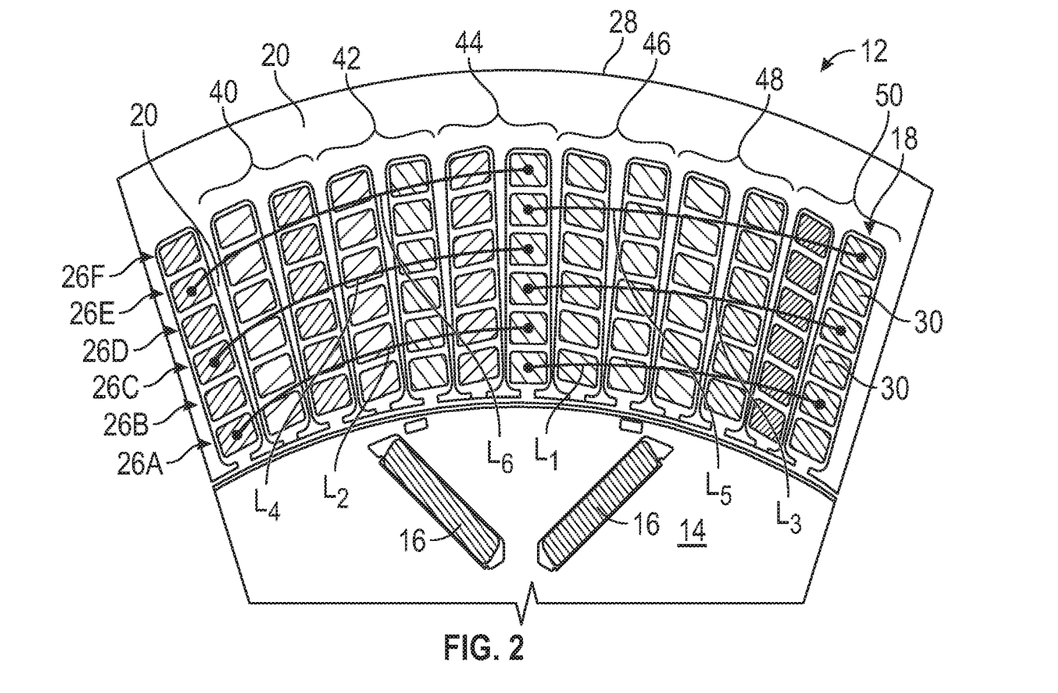
FIG. 2 is a schematic fragmentary sectional view through axis 2-2 of the stator assembly of FIG. 1.

FIG. 2 is a schematic fragmentary sectional view through axis 2-2 of the electric machine 10. Referring to FIG. 2, the electric machine 10 includes a rotor assembly 14, rotatable relative to and within the stator assembly 12. For clarity, the rotor assembly 14 is omitted in FIG. 1. The rotor assembly 14 may be annularly-shaped and include one or more permanent magnets 16. Referring to FIG. 2, the rotor assembly 14 may include but is not limited to, an interior permanent magnet, a surface permanent magnet, an induction, synchronous, reluctance or a separately-excited/wound-field rotor. Referring to FIGS. 1 and 2, the stator assembly 12 includes a plurality of stator slots 18 ("plurality of" omitted henceforth) extending through a stator core 20. The number of slots and poles in the stator assembly 12 may be varied based on the application at hand. Referring to FIG. 1, the stator slots 18 may be evenly spaced from each other radially.

Referring to FIG. 2, the stator slots 18 may define multiple respective slot layers, such as first, second, third, fourth, fifth and sixth slot layers 26A, B, C, D, E and F. Referring to FIG. 2, the first slot layer 26A is farthest from an outer diameter 28 of the stator core 20 and the sixth slot layer 26F is closest to the outer diameter 28 of the stator core 20. However, it should be appreciated that the stator slots 18 may include a different number of layers, including but not limited to, four layers or eight layers. Referring to FIGS. 1-2, the stator slots 18 may be partially open slots, fully open or closed slots.

Referring to FIG. 1, the stator assembly 12 includes a plurality of conducting members, referred to herein as a plurality of hairpins 30, which are segmented and include a respective first leg 32, a respective second leg 34 and a respective bent portion 36 sandwiched in between. The plurality of hairpins 30 is configured to allow a current to flow from the respective first leg 32 to the respective second leg 34. It is to be understood that the form and cross-sectional shape of the hairpins may be varied based on the application at hand. The plurality of hairpins 30 has their respective first leg 32 inserted into one of the multiple respective slot layers 26A-F (see FIG. 2) and their respective second leg 34 inserted into another of the multiple respective slot layers 26A-F (see FIG. 2). Slot liners (not shown) may be inserted into the stator slots 18 to electrically isolate the plurality of hairpins 30 from one another and to the stator core to prevent phase to phase or phase to ground shorts from occurring.

Referring to FIG. 1, the plurality of hairpins 30 extend through the stator slots 18 between a crown end 22 and a weld end 24. Referring to FIG. 1, the plurality of hairpins 30 may be inserted into the stator slots 18 at the crown end 22. Once the plurality of hairpins 30 is threaded through the stator slots 18, their respective distal portions 38 may be individually twisted at the weld end 24 (shown in FIG. 1) and connected to multi-phase AC windings.

The plurality of hairpins 30 may be arranged in respective conductor layers; in the example shown in FIG. 2, the plurality of hairpins 30 is arranged in first, second, third, fourth, fifth and sixth conductor layers $L_1$, $L_2$, $L_3$, $L_4$, $L_5$, $L_6$. It is to be understood that the number of conductor layers may be varied based on the application at hand. Referring to FIG. 2, the first conductor layer $L_1$ is a forward winding from the first slot layer 26A to the second slot layer 26B. In other words, the first conductor layer $L_1$ is formed by the plurality of hairpins 30 having their respective first leg 32 (see FIG. 1) in the first slot layer 26A and their respective second leg 34 (see FIG. 1) in the second slot layer 26B.

Referring to FIG. 2, the second conductor layer $L_2$ is a reverse winding from the second slot layer 26B to the first slot layer 26A. Similarly, referring to FIG. 2, the third conductor layer $L_3$ is a forward winding from the third to fourth slot layers 26C to 22D and the fourth conductor layer $L_4$ is a reverse winding from the fourth slot layer 26D to the third slot layer 26C. Referring to FIG. 2, the fifth conductor layer $L_5$ is a forward winding from the fifth slot layer 26E to the sixth slot layer 26F. The sixth conductor layer $L_6$ is a reverse winding from the sixth slot layer 26F to the fifth slot layer 26E.

The plurality of hairpins 30 form multiple winding sets within the stator slots 18 defining an identical number of multiple phases. In one embodiment, the number of multiple phases is exactly three, such as for example a "U" phase, a "V" phase and a "W" phase, respectively. In another embodiment, the number of multiple phases is five. However, the electric machine 10 is not limited to a three or five phase machine, and the number of phases may differ from the phases described herein.

Referring to FIG. 2, a first set 40 of n adjacent slots of the stator slots 18 is configured to accommodate the plurality of hairpins 30 carrying current with a first phase, n being an integer. Referring to FIG. 2, a second set 42 of n adjacent slots of the stator slots 18 is configured to accommodate the plurality of hairpins 30 carrying current with a second phase. A third set 44 of n adjacent slots of the stator slots 18 is configured to accommodate the plurality of hairpins 30 carrying current with a third phase. In other words, for every set of n adjacent stator slots 18, the first, second, third, fourth, fifth and sixth slot layers 26A-E include the plurality of hairpins 30 carrying the same phase current. Referring to FIG. 2, a fourth set 46, a fifth set 48 and a sixth set 50 may be configured to accommodate the plurality of hairpins 30 carrying an opposite current (i.e., flowing in the opposite direction) in the first, second and third phases, respectively. In a non-limiting example, the first set 40 may carry phase U−, the second set 42 may carry phase W+, the third set 44 may carry phase V−, the fourth set 46 may carry phase U+, the fifth set 48 may carry phase W− and the sixth set 50 may carry phase V+ (positive and negative signs indicating current direction). This pattern may be repeated for each of the stator slots 18. The example shown in FIG. 2 illustrates a two slot distribution (n=2). However, the value of n may be varied based on the application and may include, but is not limited to, a four slot distribution (n=4, shown in FIG. 3) and a three slot distribution (n=3, shown in FIG. 6).

As described below with respect to FIGS. 3, 5 and 6, the respective conductor layers ($L_1$, $L_2$ . . . ) include a plurality of respective turn locations defining n respective turn positions, which is the same integer n as the number of adjacent slots carrying the same phase. The plurality of hairpins 30 is configured to interchangeably occupy the n respective turn positions an equal number of times such that the respective conductor layers ($L_1$, $L_2$ . . . ) are electrically balanced. The n respective turn positions are characterized by a respective phase shifted voltage ($v_n$), in other words, a small phase shift is created by the variable positions. Because the plurality of hairpins 30 in each of the respective conductor layers ($L_1$, $L_2$ . . . ) occupy the n respective turn positions an equal number of times, they have an equal total voltage $V=(\Sigma v_{i, i=1 \text{ to } n})$ (since the order of summation does not alter the sum).

Figure 3:
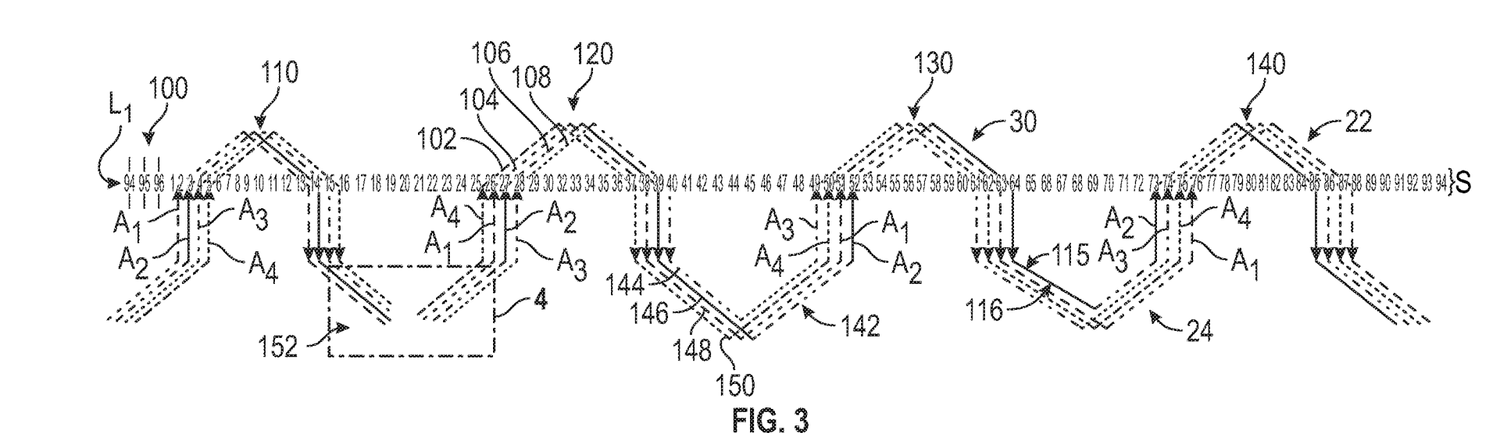
FIG. 3 is a schematic fragmentary illustration of a winding layout for the stator assembly of FIG. 1, showing a four slot distribution in accordance with a first embodiment.

Referring now to FIG. 3, a schematic fragmentary illustration of a winding layout 100 having a first conductor layer $L_1$ is shown, in accordance with a first embodiment. FIG. 3 represents the stator assembly 12 with 96 slots and 8 poles. The slot numbers are bracketed on the right by the letter "S", such that numbers 1 through 96 refer to slots S1 through S96, with the right side of the FIG. wrapping over or joining the left side of the FIG. Referring to FIG. 3, the first conductor layer $L_1$ includes a plurality of respective turn locations, such as first turn location 110, second turn location 120, third turn location 130 and fourth turn location 140.

The winding layout 100 shows a four slot distribution, with the integer n having a value of four. Accordingly, each of the first turn location 110, second turn location 120, third turn location 130 and fourth turn location 140 define n respective turn positions. The n respective turn positions are shown as first position 102, second position 104, third position 106, and fourth position 108 in FIG. 3.

Referring to FIG. 3, the first conductor layer $L_1$ includes a first hairpin $A_1$, a second hairpin $A_2$, a third hairpin $A_3$ and a fourth hairpin $A_4$, which are configured in the first turn location 110, second turn location 120, third turn location 130 and fourth turn location 140, respectively, in the following ordered combinations: ($A_1$, $A_2$, $A_3$, $A_4$), ($A_4$, $A_1$, $A_2$, $A_3$), ($A_3$, $A_4$, $A_1$, $A_2$) and ($A_2$, $A_3$, $A_4$, $A_1$). The order shown in the brackets reflects the n respective turn positions. In other words, the first hairpin $A_1$ occupies the first position 102 at the first turn location 110, the second position 104 at the second turn location 120, the third position 106 at the third turn location 130, and the fourth position 108 at the fourth turn location 140. The second hairpin $A_2$ occupies the second position 104 at the first turn location 110, the third position 106 at the second turn location 120, the fourth position 108 at the third turn location 130 and the first position 102 at the fourth turn location 140. Thus, the first hairpin $A_1$, the second hairpin $A_2$, the third hairpin $A_3$ and the fourth hairpin $A_4$ occupy the first position 102, the second position 104, the third position 106, and the fourth position 108 an equal number of times. The layout in the first conductor layer $L_1$ may be repeated in every layer, depending on the number of conductors per slot, resulting in a true scalable design.

Referring to FIG. 3, the winding layout 100 may be set up with different connections in portion 4. By modifying the connections in portion 4, different combinations of series and parallel connections may be achieved, enabling different turn count options (e.g. 4, 8 or 16 turn counts). For example, referring to FIG. 3, a first junction 142 between a first adjacent pair (second turn location 120 and third turn location 130) of the four respective turn locations may include a first series connection 144, a second series connection 146, a third series connection 148 and a fourth series connection 150.

Figure 4A:
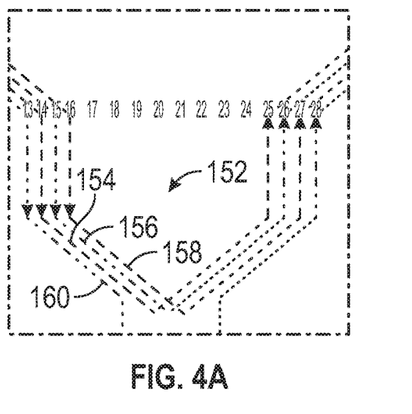
FIG. 4A is a first example of a schematic illustration of portion 4 of FIG. 3.
Figure 4B:
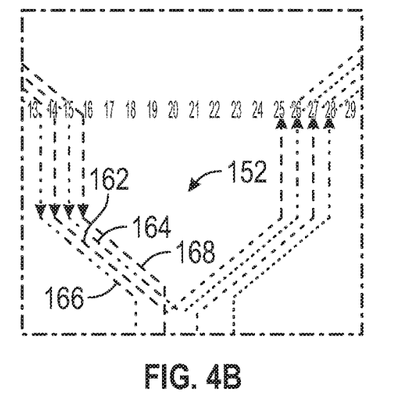
FIG. 4B is a second example of a schematic illustration of portion 4 of FIG. 3.
Figure 4C:
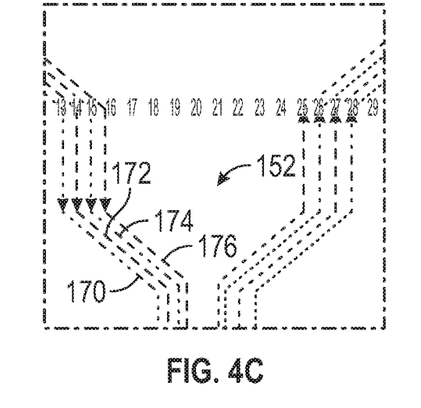
FIG. 4C is a third example of a schematic illustration of portion 4 of FIG. 3.

Referring to FIG. 3, a second junction 152 between a second adjacent pair (first turn location 110 and second turn location 120) of the four respective turn locations may be configured in several ways. FIG. 4A is a first example view of portion 4 of FIG. 3, showing the second junction 152 with as a first series connection 154, a second series connection 156, a third series connection 158 and a first parallel connection 160. FIG. 4B is a second example view of portion 4 of FIG. 3, showing the second junction 152 with a first series connection 162, a second series connection 164, a first parallel connection 166 and a second parallel connection 168. FIG. 4C is a third example view of portion 4 of FIG. 3, showing the second junction 152 with a first parallel connection 170, a second parallel connection 172, a third parallel connection 174 and a fourth parallel connection 176.

Referring to FIG. 3, the first conductor layer $L_1$ includes a nested conductor 115 encapsulated by (or buried underneath) remaining ones of the plurality of hairpins 30 at the crown end 22. The nested conductor 115 may be hidden from view at the crown end 22. The nested conductor 115 may be at least partially coated with a layer of epoxy 116 to prevent winding short issues.

Figure 5:
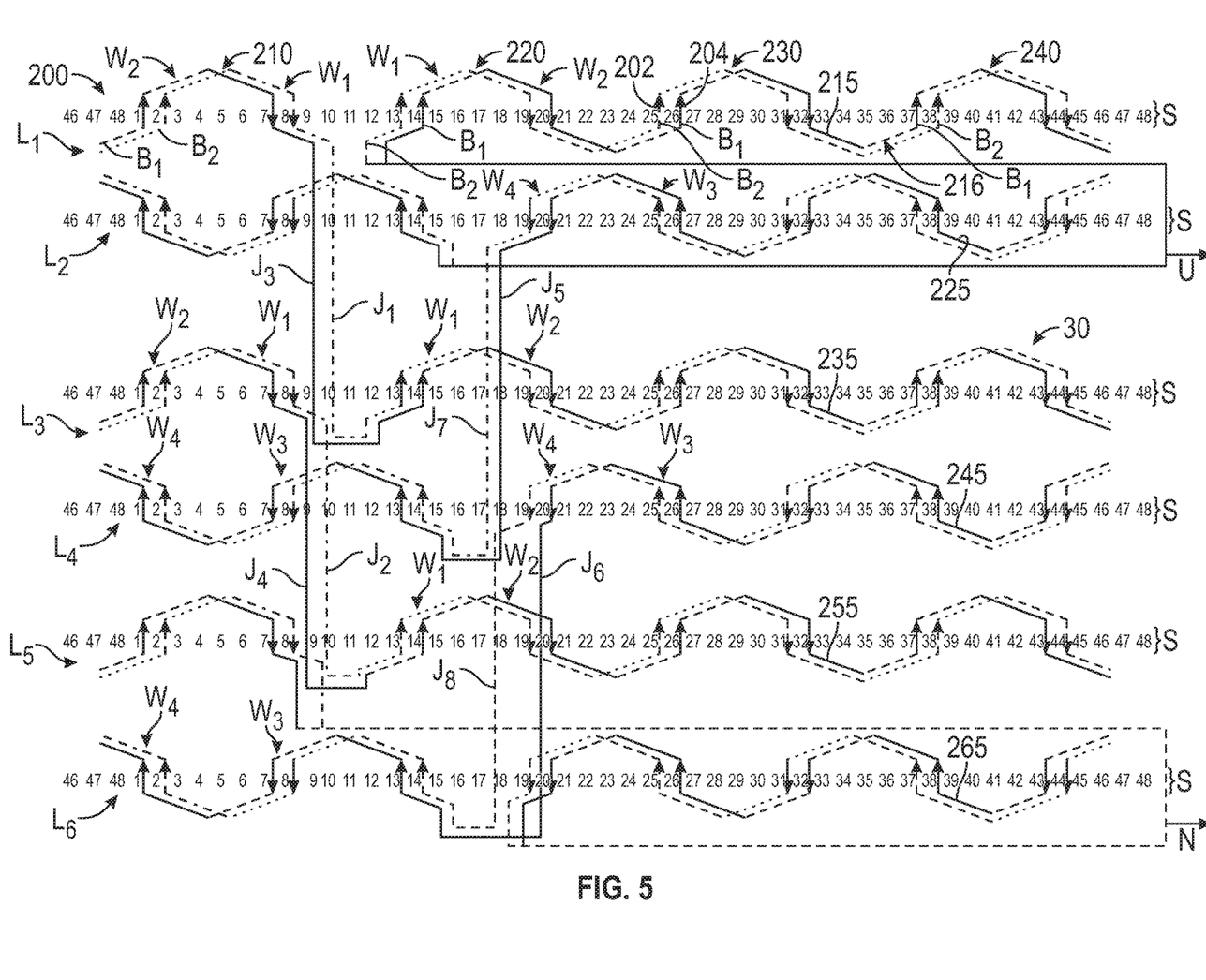
FIG. 5 is a schematic illustration of a winding layout for the stator assembly of FIG. 1, showing a two slot distribution in accordance with a second embodiment.

FIG. 5 is a schematic illustration of a winding layout 200 with a two slot distribution, in accordance with a second embodiment. FIG. 5 represents the stator assembly 12 with 48 slots and 8 poles. The slot numbers are bracketed on the right by the letter "S", such that numbers 1 through 48 refer to slots S1 through S48, with the right side of the FIG. wrapping over or joining the left side of the FIG. The winding layout 200 includes a first conductor layer $L_1$, a second conductor layer $L_2$, a third conductor layer $L_3$, a fourth conductor layer $L_4$, a fifth conductor layer $L_5$ and a sixth conductor layer $L_6$, each incorporating a plurality of hairpins 30 spanning different lengths or angular distances between slots (S1 through S48). As noted above, the number of conductor layers and turn counts may be varied based on the application at hand.

Referring to FIG. 5, the first conductor layer $L_1$ includes a plurality of respective turn locations, such as first turn location 210, second turn location 220, third turn location 230 and fourth turn location 240, each defining n respective turn positions. The winding layout 200 shows a two slot distribution, with the integer n having a value of two. Accordingly, each of the first turn location 210, second turn location 220, third turn location 230 and fourth turn location 240 define two respective turn positions, shown as first position 202 and second position 204, in FIG. 5. Referring to FIG. 5, the first conductor layer $L_1$ includes a first hairpin $B_1$ and a second hairpin $B_2$, which are configured in the first turn location 210, second turn location 220, third turn location 230 and fourth turn location 240, respectively, in the following ordered combinations: $(B_1, B_2)$, $(B_2, B_1)$, $(B_2, B_1)$ and $(B_1, B_2)$. The order in the brackets reflects the n respective turn positions. Thus, the first hairpin $B_1$ and the second hairpin $B_2$ occupy the first position 202 and the second position 204 an equal number of times. As a result, other ordered combinations such as $(B_1, B_2)$, $(B_1, B_2)$, $(B_2, B_1)$ and $(B_2, B_1)$ or $(B_2, B_1)$, $(B_2, B_1)$, $(B_1, B_2)$ and $(B_1, B_2)$ are possible as long as the first position 202 and the second position 204 are occupied an equal number of times.

The above ordered combinations may be repeated for the second conductor layer $L_2$, the third conductor layer $L_3$, the fourth conductor layer $L_4$, the fifth conductor layer $L_5$ and the sixth conductor layer $L_6$. Because the individual respective conductor layers are electrically balanced, the winding layout 200 may be readily configured into different series or parallel connections without issues of circulating current, resulting in a scalable design with multiple turn count options.

Similar to FIG. 3, the first conductor layer $L_1$ in FIG. 5 includes a first nested conductor 215 covered or encapsulated or buried underneath remaining ones of the plurality of hairpins 30 at the crown end 22, with the first nested conductor 215 being hidden from view at the crown end 22 (see FIGS. 1 and 3). The first nested conductor 215 may be coated with a layer of epoxy 216 to prevent winding short issues. The second conductor layer $L_2$, the third conductor layer $L_3$, the fourth conductor layer $L_4$, the fifth conductor layer $L_5$ and the sixth conductor layer $L_6$ may include a second nested conductor 225, a third nested conductor 235, a fourth nested conductor 245, a fifth nested conductor 255 and a sixth nested conductor 265, respectively.

Referring to FIG. 5, the plurality of hairpins 30 may be configured as a first winding set $W_1$, a second winding set $W_2$, a third winding set $W_3$ and a fourth winding set $W_4$ connected in parallel to one another. Referring to FIG. 5, the first winding set $W_1$ includes 4 of the plurality of hairpins 30 from the first conductor layer $L_1$ connected in series (via first jumper $J_1$) with four of the plurality of hairpins 30 from the third conductor layer $L_3$ and in series (via second jumper $J_2$) with four of the plurality of hairpins 30 from the fifth conductor layer $L_5$. Referring to FIG. 5, the second winding set $W_2$ includes four of the plurality of hairpins 30 from the first conductor layer $L_1$ connected in series (via third jumper $J_3$) with four of the plurality of hairpins 30 from the third conductor layer $L_3$ and connected in series (via fourth jumper $J_4$) with four of the plurality of hairpins 30 from the fifth conductor layer $L_5$.

Referring to FIG. 5, the third winding set $W_3$ includes four of the plurality of hairpins 30 from the second conductor layer $L_2$ connected in series (via fifth jumper $J_5$) with four of the plurality of hairpins 30 from the fourth conductor layer $L_4$ and connected in series (via sixth jumper $J_6$) with four of the plurality of hairpins 30 from the sixth conductor layer $L_6$. The fourth winding set $W_4$ includes four of the plurality of hairpins 30 from the second conductor layer $L_2$ connected in series (via seventh jumper $J_7$) with four of the plurality of hairpins 30 from the fourth conductor layer $L_4$ and connected in series (via eighth jumper $J_8$) with four of the plurality of hairpins 30 from the sixth conductor layer $L_6$. It is to be understood that the winding connections may be varied.

Figure 6:
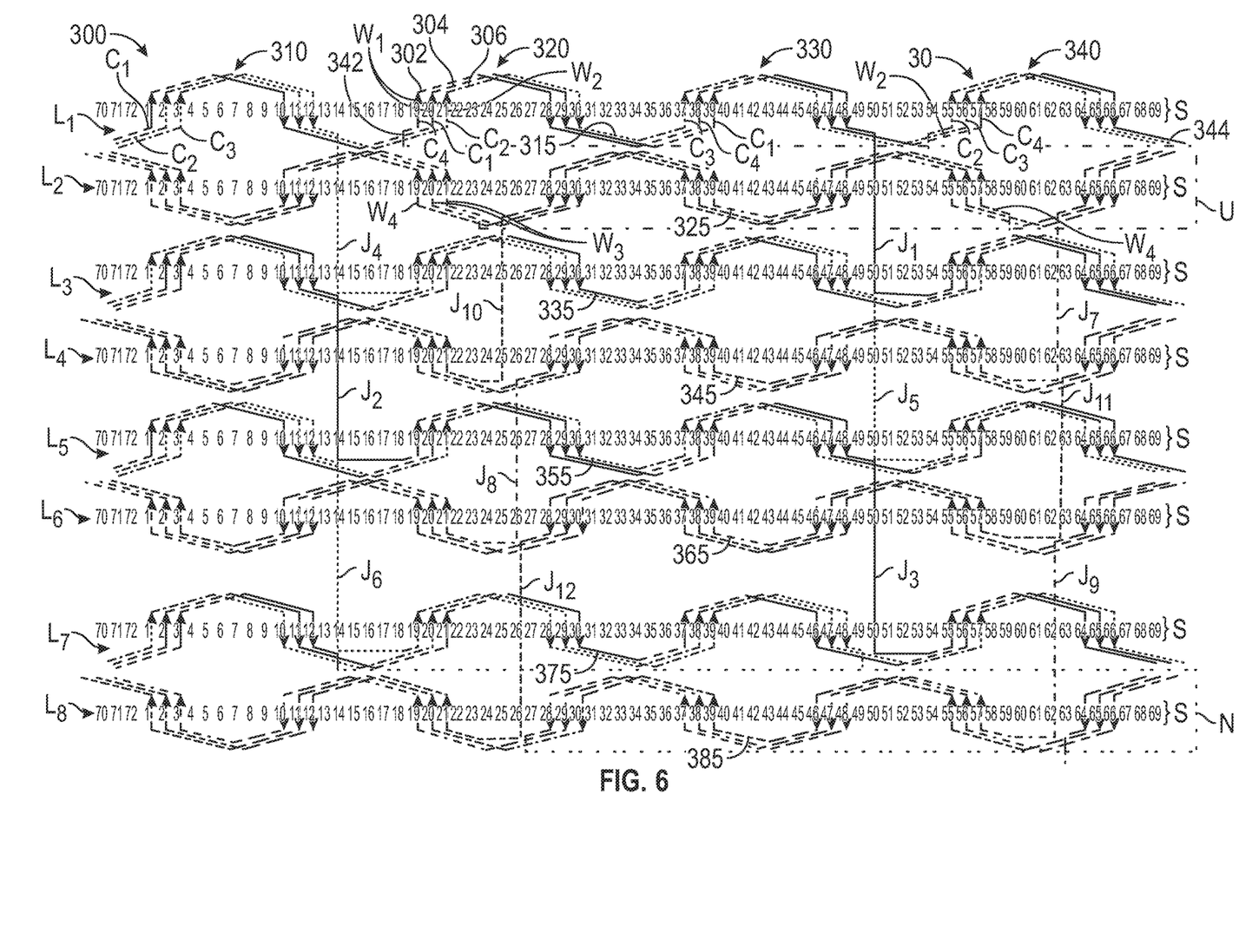
FIG. 6 is a schematic illustration of a winding layout for the stator assembly of FIG. 1, showing a three slot distribution in accordance with a third embodiment.

The letter "N" in FIGS. 5-6 refers to the neutral connection. Referring to FIGS. 5 and 6, the entering lead (from phase U) and exiting lead (neutral N) are shown. While the winding layout 200, 300 in FIGS. 5 and 6 are shown for phase U, the layouts for phases V and W are similar. The circuit connections may be made, for example, with a "Y" configuration without a common neutral or a Delta connection or other suitable configuration as understood by those skilled in the art.

FIG. 6 is a schematic illustration of a winding layout 300, in accordance with a third embodiment. FIG. 6 represents the stator assembly 12 with 72 slots and 8 poles. The slot numbers are bracketed on the right by the letter "S", such that numbers 1 through 72 refer to slots S1 through S72, with the right side of the FIG. wrapping over or joining the left side of the FIG. The winding layout 300 includes a first conductor layer $L_1$, a second conductor layer $L_2$, a third conductor layer $L_3$, a fourth conductor layer $L_4$, a fifth conductor layer $L_5$, a sixth conductor layer $L_6$, a seventh conductor layer $L_7$ and an eighth conductor layer $L_8$, each incorporating a plurality of hairpins 30 spanning different lengths or angular distances between (S1 through S72). Referring to FIG. 6, the first conductor layer $L_1$ includes a plurality of respective turn locations, such as first turn location 310, second turn location 320, third turn location 330 and fourth turn location 340, each defining n respective turn positions.

The winding layout 300 shows a three slot distribution, with the integer n having a value of three. Accordingly, each of the first turn location 310, second turn location 320, third turn location 330 and fourth turn location 340 define three respective turn positions, shown as first position 302, second position 304 and third position 306, in FIG. 6. Referring to FIG. 3, the first conductor layer $L_1$ includes a first hairpin $C_1$, a second hairpin $C_2$, a third hairpin $C_3$ and a fourth hairpin $C_4$, which are configured in the first turn location 310, second turn location 320, third turn location 330 and fourth turn location 340, respectively, in the following ordered combinations: $(C_1, C_2, C_3)$, $(C_4, C_1, C_2)$, $(C_3, C_4, C_1)$ and $(C_2, C_3, C_4)$. The order in the brackets reflects the n respective turn positions. The above ordered combination may be repeated for the second conductor layer $L_2$, the third conductor layer $L_3$, the fourth conductor layer $L_4$, the fifth conductor layer $L_5$, the sixth conductor layer $L_6$, the seventh conductor layer $L_7$ and the eighth conductor layer $L_8$.

For a three-slot distribution, the start location and end location are different for the respective hairpins. For example, referring to FIG. 6, the fourth hairpin $C_4$ begins at the start location 342 and ends at the end location 344, over a span of three poles. Each of the plurality of hairpins 30 in FIG. 6 spans over three poles, since there are three conductors per slot. Each of the first hairpin $C_1$, second hairpin $C_2$, third hairpin $C_3$ and fourth hairpin $C_4$ may be connected in any combination (e.g., four parallel, four series, two series with two parallel etc.) since the start location and the end location are not the same. In contrast, with the four slot distribution in FIG. 3, the first hairpin $A_1$, second hairpin $A_2$, third hairpin $A_3$ and fourth hairpin $A_4$ start and end in the same location 152.

The first conductor layer $L_1$ in FIG. 6 includes a first nested conductor 315 covered or encapsulated by the remaining ones of the plurality of hairpins 30 such that the nested conductor 315 is not visible from the crown end 22 (see FIGS. 1 and 3). Referring to FIG. 6, the second conductor layer $L_2$, the third conductor layer $L_3$, the fourth conductor layer $L_4$, the fifth conductor layer $L_5$, the sixth conductor layer $L_6$ the seventh conductor layer $L_7$ and the eighth conductor layer $L_8$ include a second nested conductor 325, a third nested conductor 335, a fourth nested conductor 345, a fifth nested conductor 355, a sixth nested conductor 365, a seventh nested conductor 375 and an eighth nested conductor 385, respectively.

The winding layout 300 of FIG. 6 may be configured as four winding sets connected in parallel to one another—a first winding set $W_1$, a second winding set $W_2$, a third winding set $W_3$ and a fourth winding set $W_4$. Referring to FIG. 6, the first winding set $W_1$ includes the plurality of hairpins 30 from the first conductor layer $L_1$ connected in series with the third conductor layer $L_3$ (via first jumper $J_1$), in series with the fifth conductor layer $L_5$ (via second jumper $J_2$) and in series with the seventh conductor layer $L_7$ (via third jumper $J_3$). Referring to FIG. 6, the second winding set $W_2$ includes the plurality of hairpins 30 from the first conductor layer $L_1$ connected in series with the third conductor layer $L_3$ (via fourth jumper $J_4$), in series with the fifth conductor layer $L_5$ (via fifth jumper $J_5$) and in series with the seventh conductor layer $L_7$ (via sixth jumper $J_6$).

Referring to FIG. 6, the third winding set $W_3$ includes the plurality of hairpins 30 from the second conductor layer $L_2$ connected in series with the fourth conductor layer $L_4$ (via seventh jumper $J_7$), in series with the sixth conductor layer $L_6$ (via eighth jumper $J_8$) and in series with the eighth conductor layer $L_8$ (via ninth jumper $J_9$). The fourth winding set $W_4$ includes the plurality of hairpins 30 from the second conductor layer $L_2$ connected in series with the fourth conductor layer $L_4$ (via tenth jumper $J_{10}$), in series with the sixth conductor layer $L_6$ (via eleventh jumper $J_{11}$) and in series with the eighth conductor layer $L_8$ (via twelfth jumper $J_{12}$). It is to be understood that the winding connections may be varied.

The winding layouts 100, 200, 300 shown in FIGS. 3, 5 and 6 allow for greater flexibility in designing an electric machine 10 with a particular torque or system voltage requirement. Because the individual respective conductor layers ($L_1$, $L_2$ . . . ) are fully balanced, the winding layouts 100, 200, 300 may be configured with different series or parallel connections without issues of circulating current, resulting in a scalable design with numerous turn count options.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A stator assembly comprising:
a plurality of stator slots having multiple respective slot layers;
a plurality of hairpins having a respective first leg positioned in one of the multiple respective slot layers and a respective second leg positioned in another of the multiple respective slot layers, the plurality of hairpins being configured to allow a current to flow from the respective first leg to the respective second leg;
wherein a first set of n adjacent slots of the plurality of stator slots is configured to accommodate the plurality of hairpins carrying the current in a first phase, n being an integer;
wherein the plurality of hairpins is configured in respective conductor layers having a plurality of respective turn locations defining n respective turn positions;
wherein the plurality of hairpins is configured to occupy the n respective turn positions an equal number of times such that the respective conductor layers are electrically balanced;
wherein the plurality of hairpins in the respective conductor layers include a first hairpin ($A_1$), a second hairpin ($A_2$), a third hairpin ($A_3$) and a fourth hairpin ($A_4$), the integer n having a value of four; and
the plurality of respective turn locations includes four respective turn locations configured as ($A_1$, $A_2$, $A_3$, $A_4$), ($A_4$, $A_1$, $A_2$, $A_3$), ($A_3$, $A_4$, $A_1$, $A_2$) and ($A_2$, $A_3$, $A_4$, $A_1$), respectively.

2. The stator assembly of claim 1, wherein:
the n respective turn positions are characterized by a respective phase shifted voltage ($v_n$), the plurality of hairpins in the respective conductor layers having an equal total voltage $V=(\Sigma v_{i,\ i=1\ to\ n})$;
a second set of n adjacent slots of the plurality of stator slots is configured to accommodate the plurality of hairpins carrying the current in a second phase; and
a third set of n adjacent slots of the plurality of stator slots is configured to accommodate the plurality of hairpins carrying the current in a third phase.

3. The stator assembly of claim 1, wherein:
the plurality of hairpins extend through the plurality of stator slots between a crown end and a weld end; and
at least one of the plurality of hairpins in the respective conductor layers is a nested conductor encapsulated by remaining ones of the plurality of hairpins at the crown end.

4. The stator assembly of claim 3, further comprising:
an epoxy coating at least partially covering the nested conductor, the epoxy coating configured to minimize direct contact between the nested conductor and remaining ones of the plurality of hairpins.

5. The stator assembly of claim 1, wherein:
a first junction between a first adjacent pair of the four respective turn locations includes four series connections.

6. The stator assembly of claim 5, wherein:
a second junction between a second adjacent pair of the four respective turn locations includes at least one parallel connection and at least one series connection.

7. The stator assembly of claim 5, wherein:
a second junction between a second adjacent pair of the four respective turn locations includes four parallel connections.

8. The stator assembly of claim 1, wherein:
the respective conductor layers include first, second, third, fourth, fifth and sixth conductor layers; and the multiple respective slot layers includes first, second, third, fourth, fifth and sixth slot layers.

9. The stator assembly of claim 8, wherein:
the first conductor layer is defined by the plurality of hairpins with the respective first leg in the first slot layer and the respective second leg in the second slot layer;
the second conductor layer is defined by the plurality of hairpins with the respective first leg in the second slot layer and the respective second leg in the first slot layer;
the third conductor layer is defined by the plurality of hairpins with the respective first leg in the third slot layer and the respective second leg in the fourth slot layer;
the fourth conductor layer is defined by the plurality of hairpins with the respective first leg in the fourth slot layer and the respective second leg in the third slot layer;
the fifth conductor layer is defined by the plurality of hairpins with the respective first leg in the fifth slot layer and the respective second leg in the sixth slot layer; and
the sixth conductor layer is defined by the plurality of hairpins with the respective first leg in the sixth slot layer and the respective second leg in the fifth slot layer.

10. The stator assembly of claim 9, wherein:
the plurality of hairpins is configured as a first winding set, a second winding set, a third winding set and a fourth winding set connected in parallel to one another;
the first winding set includes four of the plurality of hairpins from the first conductor layer connected in series via a first jumper with four of the plurality of hairpins from the third conductor layer and connected in series via a second jumper with four of the plurality of hairpins from the fifth conductor layer;
the second winding set includes four of the plurality of hairpins from the first conductor layer connected in series via a third jumper with four of the plurality of hairpins from the third conductor layer and connected in series via a fourth jumper with four of the plurality of hairpins from the fifth conductor layer;
the third winding set includes four of the plurality of hairpins from the second conductor layer connected in series via a fifth jumper with four of the plurality of hairpins from the fourth conductor layer and connected in series via a sixth jumper with four of the plurality of hairpins from the sixth conductor layer; and
the fourth winding set includes four of the plurality of hairpins from the second conductor layer connected in series via a seventh jumper with four of the plurality of hairpins from the fourth conductor layer and connected in series via an eighth jumper with four of the plurality of hairpins from the sixth conductor layer.

11. A stator assembly comprising:
a plurality of stator slots having multiple respective slot layers;
a plurality of hairpins having a respective first leg positioned in one of the multiple respective slot layers and a respective second leg positioned in another of the multiple respective slot layers, the plurality of hairpins being configured to allow a current to flow from the respective first leg to the respective second leg;
wherein a first set of n adjacent slots of the plurality of stator slots is configured to accommodate the plurality of hairpins carrying the current in a first phase, n being an integer;
wherein the plurality of hairpins is configured in respective conductor layers having a plurality of respective turn locations defining n respective turn positions characterized by a respective phase shifted voltage ($v_n$);
wherein the plurality of hairpins is configured to occupy the n respective turn positions an equal number of times such that the respective conductor layers are electrically balanced, the plurality of hairpins in the respective conductor layers having an equal total voltage $V = (\Sigma v_{i,\ i=1\ to\ n})$;
wherein the plurality of hairpins extends through the plurality of stator slots between a crown end and a weld end;
at least one of the plurality of hairpins in the respective conductor layers is a nested conductor encapsulated by remaining ones of the plurality of hairpins at the crown end;
wherein the plurality of hairpins in the respective conductor layers includes a first hairpin ($C_1$), a second hairpin ($C_2$), a third hairpin ($C_3$) and a fourth hairpin ($C_4$), the integer n having a value of three; and
wherein the plurality of respective turn locations includes four respective turn locations configured as ($C_1$, $C_2$, $C_3$), ($C_4$, $C_1$, $C_2$), ($C_3$, $C_4$, $C_1$) and ($C_2$, $C_3$, $C_4$), respectively.

12. The stator assembly of claim 11, further comprising:
an epoxy coating at least partially covering the nested conductor, the epoxy coating configured to minimize direct contact between the nested conductor and the remaining ones of the plurality of hairpins.

13. The stator assembly of claim 11, wherein:
a first junction between a first adjacent pair of the four respective turn locations includes four series connections.

14. The stator assembly of claim 13, wherein:
a second junction between a second adjacent pair of the four respective turn locations includes at least one parallel connection and at least one series connection.

15. A stator assembly comprising:
a plurality of stator slots having multiple respective slot layers;
a plurality of hairpins having a respective first leg positioned in one of the multiple respective slot layers and a respective second leg positioned in another of the multiple respective slot layers, the plurality of hairpins being configured to allow a current to flow from the respective first leg to the respective second leg;
wherein a first set of n adjacent slots of the plurality of stator slots is configured to accommodate the plurality of hairpins carrying the current in a first phase, n being an integer;
wherein the plurality of hairpins is configured in respective conductor layers having a plurality of respective turn locations defining n respective turn positions;
wherein the plurality of hairpins is configured to occupy the n respective turn positions an equal number of times such that the respective conductor layers are electrically balanced;
wherein the plurality of hairpins in the respective conductor layers include a first hairpin ($C_1$), a second hairpin ($C_2$), a third hairpin ($C_3$) and a fourth hairpin ($C_4$), the integer n having a value of three; and
wherein the plurality of respective turn locations includes four respective turn locations configured as ($C_1$, $C_2$, $C_3$), ($C_4$, $C_1$, $C_2$), ($C_3$, $C_4$, $C_1$) and ($C_2$, $C_3$, $C_4$), respectively.

* * * * *